(12) United States Patent
Von Rhein (10) Patent No.: US 12,085,634 B2
(45) Date of Patent: Sep. 10, 2024

(54) METHOD FOR CAPTURE IN A RADAR SYSTEM

(71) Applicant: HELLA GmbH & Co. KGaA, Lippstadt (DE)

(72) Inventor: Andreas Von Rhein, Salzkotten (DE)

(73) Assignee: Hella GmbH & Co. KGaA, Lippstadt (DE)

(*) Notice: Subject to any disclaimer, the term of this patent is extended or adjusted under 35 U.S.C. 154(b) by 637 days.

(21) Appl. No.: 17/222,569

(22) Filed: Apr. 5, 2021

(65) Prior Publication Data

US 2021/0223383 A1 Jul. 22, 2021

Related U.S. Application Data

(63) Continuation of application No. PCT/EP2019/075727, filed on Sep. 24, 2019.

(30) Foreign Application Priority Data

Oct. 5, 2018 (DE) ...................... 10 2018 124 582.3

(51) Int. Cl.
*G01S 13/58* (2006.01)
*G01S 7/35* (2006.01)
(Continued)

(52) U.S. Cl.
CPC ............ *G01S 13/584* (2013.01); *G01S 7/354* (2013.01); *G01S 7/4026* (2013.01);
(Continued)

(58) Field of Classification Search
None
See application file for complete search history.

(56) References Cited

U.S. PATENT DOCUMENTS

| 6,856,280 B1 | 2/2005 | Eder et al. |
| 7,800,453 B2 | 9/2010 | Milano |

(Continued)

FOREIGN PATENT DOCUMENTS

| CN | 106796283 A | 5/2017 |
| DE | 10231597 A1 | 1/2004 |

(Continued)

OTHER PUBLICATIONS

Written Opinion of the International Searching Authority for application PCT/EP2019/075727, mailed on Jan. 17, 2020. (Year: 2020).*

(Continued)

*Primary Examiner* — Bernarr E Gregory
(74) *Attorney, Agent, or Firm* — Muncy, Geissler, Olds & Lowe, P.C.

(57) ABSTRACT

A method for capture in a radar system having at least one receive antenna of a vehicle, wherein the following steps are carried out repeatedly: carrying out a capture of a sensor signal in each of the receive antennas of the radar system, wherein the sensor signal captured as a result is specific for a detection of raw targets by the radar system, and carrying out a comparison of the captured sensor signal or the captured sensor signals of different receive antennas for the provision in each case of a phase-adjusted sensor signal, wherein the phase-adjusted sensor signals from different repetitions of the steps are combined to provide a capture result.

14 Claims, 7 Drawing Sheets

(51) Int. Cl.
*G01S 7/40* (2006.01)
*G01S 13/931* (2020.01)

(52) U.S. Cl.
CPC ... *G01S 13/931* (2013.01); *G01S 2013/93274* (2020.01); *G01S 2013/93275* (2020.01)

(56) References Cited

U.S. PATENT DOCUMENTS

| | | |
|---|---|---|
| 10,416,299 B2 | 9/2019 | Schoor et al. |
| 10,914,818 B2 | 2/2021 | Schoor |
| 2005/0035902 A1 | 2/2005 | Eder et al. |
| 2008/0088498 A1* | 4/2008 | Suzuki ............... G01S 13/931 342/90 |
| 2008/0224916 A1* | 9/2008 | Takagi ............... G01S 13/931 342/91 |
| 2009/0121918 A1* | 5/2009 | Shirai ............... G01S 13/931 342/159 |
| 2015/0035697 A1 | 2/2015 | Cho |
| 2017/0131393 A1 | 5/2017 | Schoor et al. |
| 2018/0143297 A1 | 5/2018 | Jansen |

FOREIGN PATENT DOCUMENTS

| | | |
|---|---|---|
| DE | 102010045980 A1 | 5/2011 |
| DE | 102010002004 A1 | 8/2011 |
| DE | 102013212090 A1 | 1/2015 |
| DE | 102014224001 A1 | 5/2016 |
| JP | 2002162460 A * | 6/2002 ............... G01S 7/40 |

OTHER PUBLICATIONS

International Search Report dated Jan. 17, 2020 in corresponding application PCT/EP2019/075727.

* cited by examiner

SENSOR SIGNAL 101 IS CAPTURED AT EACH RECEIVE ANTENNA 30 OF RADAR SYSTEM 10, WHERE SENSOR SIGNAL 102 CAPTURED AS A RESULT IS SPECIFIC FOR A DETECTION OF RAW TARGETS 5 BY RADAR SYSTEM 10
501

A COMPARISON OF THE CAPTURED SENSOR SIGNALS 102 OF DIFFERENT RECEIVE ANTENNAS 30 IS CARRIED OUT TO PROVIDE A PHASE-ADJUSTED SENSOR SIGNAL 120
502

COMBINING 150 OF THE PHASE-ADJUSTED SENSOR SIGNALS 120 FROM THE DIFFERENT REPETITIONS OF THE STEPS IS CARRIED OUT TO PROVIDE A CAPTURE RESULT 121
503

Fig. 7

METHOD FOR CAPTURE IN A RADAR SYSTEM

This nonprovisional application is a continuation of International Application No. PCT/EP2019/075727, which was filed on Sep. 24, 2019 and which claims priority to German Patent Application No. 10 2018 124 582.3, which was filed in Germany on Oct. 5, 2018 and which are both herein incorporated by reference.

BACKGROUND OF THE INVENTION

Field of the Invention

The present invention relates to a method for capture in a radar system. Further, the invention relates to a radar system.

Description of the Background Art

It is known from the state of the art that in a radar system of a vehicle, reflected signals are captured at regular intervals by the radar system in order to detect raw targets in the vehicle environment based on this capture. The so-called signal-to-noise ratio can be a quality measure for this detection. It has been shown that a longer measurement or integration of a capture signal can improve this value.

However, it is often a problem that the measurement time or integration time in a radar system cannot be easily extended. The increase in the measurement time or integration time can also lead to a higher power consumption.

SUMMARY OF THE INVENTION

It is therefore an object of the present invention to reduce at least partially the above-described disadvantages. In particular, it is an object to provide an improved capture in a radar system of a vehicle.

The object is achieved in particular by a method for capture in a radar system having at least one or at least two receive antennas of a vehicle.

In this case, it is provided in particular that the following steps are carried out repeatedly, preferably one after the other in the order specified or in any order, wherein individual steps can also be carried out repeatedly: carrying out a capture of a sensor signal in each of the receive antennas of the radar system, wherein the sensor signal captured as a result is specific for a detection of raw targets by the radar system, carrying out a processing and in particular a comparison of the captured sensor signal (in particular of the same receive antenna)—or the captured sensor signals of different receive antennas—for the provision in each case of a phase-adjusted sensor signal, wherein in particular the captured sensor signal of a first receive antenna as a reference antenna is compared hereby with the captured sensor signal of a second receive antenna, and/or (in particular independently thereof) the captured sensor signal of the reference antenna is compared with the captured sensor signal of a third receive antenna, and/or (in particular independently thereof) the captured sensor signal of the reference antenna is compared with the captured sensor signal of a fourth receive antenna.

The aforementioned steps can be carried out repeatedly, wherein in particular the time period or time intervals of the individual repetitions correspond to a cycle duration.

In addition to improving the signal-to-noise ratio of an antenna, a method of the invention can optionally achieve the advantage that all further receive antennas achieve an equivalent improvement in order to be able to determine an angle of arrival.

It is possible that in a method of the invention, preferably after the comparison and/or with each repetition, a combining of the phase-adjusted sensor signals from different repetitions of the steps is carried out in order to provide a capture result.

Thus, for example, within a repetition, the phase-adjusted sensor signal of a particular receive antenna from this repetition can be combined with the phase-adjusted sensor signal of the same receive antenna from the previous repetition. This combining can be carried out, for example, for the second and/or third and/or fourth receive antenna and/or others (including the reference antenna).

In the context of the invention, a comparison can be understood to mean in particular a processing (e.g., carried out by a computer) in which the captured sensor signal of a same receive antenna and/or the captured sensor signals of different receive antennas are processed together and are therefore taken into account. In this way, a comparison is made possible, e.g., in that the result of the processing depends on the differences in the sensor signals from one another (such as the phase difference). It can also be possible for the sensor signal of a single receive antenna to be compared with itself or processed, e.g., by multiplying the sensor signal with the conjugate complex sensor signal.

Two possible variants for the comparison are shown below by way of example. The comparison can be made accordingly using each of these two variants, the second being a simplification of the first:

A first embodiment of the comparison according to a first variant is shown below by way of example. Thus, the sensor signal can be described in the following form as m(t,l):

$$m(t, l) = \sum_{n=0}^{N-1} A_n e^{i\omega_n(t)t} e^{i\theta_l} + \varepsilon_l$$

with t as time, l as an antenna number, $$m(t, l) = \sum_{n=0}^{N-1} A_n e^{i\omega_n(t)t} e^{i\theta_l} + \varepsilon_l$$

as the noise in this antenna, and $\omega_n(t)$ as a frequency of the target, and $A_n$ as an amplitude of the target/source. $\omega_n(t)$ in this case can be regarded as constant for a short observation period but will change over a longer period of time.

$$\omega_n(t) = \omega_{n0} + \alpha v_n t$$

In this case, a is a constant and contains all HF parameters (chirp parameterization, carrier frequency).

The measurement can now take place at different times, therefore: $T_0$, $T_1$, $T_2$, etc., wherein the sequence does not have to be equidistant. It is possible, e.g., that the time points are defined as follows: $T_0=0$, $T_1=50$ ms, $T_2=78$ ms, $T_3=113$ ms, etc.

A Fourier transformation (FT) can now be used to obtain m(w) over a short section of m(t), e.g., FT over 8 ms. In addition to noise, m(w) also contains the sources s at time $T_k$ $$m(\omega, T_k, l) = \begin{cases} \omega = \omega_n(T_k) & A_n e^{i\omega_n(T_k)T_k} e^{i\theta_l} + \varepsilon_{l,T_k}(\omega_n) \\ \omega \neq \omega_n(T_k) & \varepsilon_{l,T_k}(\omega) \end{cases}$$

ε can now be greater than or equal to $A_n$ so that the peak in the spectrum cannot be seen. By coherently adding multiple measurements, $A_n$ could be raised well above ε.

Because the measurement times $T_k$ are not known with arbitrary precision, $\omega_n$ is also not known with arbitrary precision: $T_k = T_k + T_{jitter}$. Similarly, $\omega_n$ need not behave as above. This uncertainty is also packed in $T_{jitter}$ in a first approximation.

$$m(\omega, T_k, l) = \begin{cases} \omega = \omega_n(T_k) & A_n e^{i\omega_n(T_k + t_{jitter})(T_k + t_{jitter})} e^{i\theta_l} + \varepsilon_{l,T_k}(\omega_n) \\ \omega \neq \omega_n(T_k) & \varepsilon_{l,T_k}(\omega) \end{cases}$$

The coherent addition can be made impossible by the uncertainty of $T_{jitter}$. Therefore, according to the invention, it can optionally be utilized that $T_{jitter}$ is the same for all receive antennas and is multiplied by the negative phase per frequency bin:

$$m_{MIA}(\omega, T_k, l) =$$

$$m(\omega, T_k, l)e^{-i\,phase(m(\omega,T_k,l=0))} =$$

$$\begin{cases} \omega = \omega_n(T_k) & \left(A_n e^{i\omega_n(T_k+t_{jitter})(T_k+t_{jitter})} e^{i\theta_l} + \varepsilon_{l,T_k}(\omega_n)\right) e^{-i\omega_n(T_k+t_{jitter})} e^{-i\theta_0} e^{-i\delta_{\varepsilon,0,\omega_n}} \\ \omega \neq \omega_n(T_k) & \varepsilon_{l,T_k}(\omega)e^{-i\delta_{\varepsilon,0,\omega}} \end{cases} =$$

$$\begin{cases} \omega = \omega_n(T_k) & A_n e^{i(\theta_l-\theta_0)} e^{-i\delta_{\varepsilon,0,\omega_n}} + \varepsilon_{l,T_k}(\omega_n)e^{-i\omega_n(T_k+t_{jitter})(T_k+t_{jitter})} e^{-i\theta_0} e^{-i\delta_{\varepsilon,0,\omega_n}} \\ \omega \neq \omega_n(T_k) & \varepsilon_{l,T_k}(\omega)e^{-i\delta_{\varepsilon,0,\omega}} \end{cases}$$

The noise components are redefined because only the phase was turned here into:

$$m_{MIA}(\omega, T_k, l) = \begin{cases} \omega = \omega_n(T_k) & A_n e^{i(\theta_l-\theta_0)} e^{-i\delta_{\varepsilon,0,\omega_n}} + \varepsilon_{MIA,l,T_k}(\omega_n) \\ \omega \neq \omega_n(T_k) & \varepsilon_{MIA,l,T_k}(\omega) \end{cases}$$

If the noise component $e(j*\delta)$ is now rewritten as $e(-j*\delta)=$ (1b), multiplication results in:

$$A_n e^{i(\theta_l-\theta_0)} e^{-i\delta_{\varepsilon,0,\omega_n}} = A_n e^{i(\theta_l-\theta_0)}(1+b) = A_n e^{i(\theta_l-\theta_0)} + bA_n e^{i(\theta_l-\theta_0)}$$

b is interpreted as "noise-like" and therefore the entire term $\varepsilon_{MIA}$ is attributed.

It follows:

$$m_{MIA}(\omega, T_k, l) = \begin{cases} \omega = \omega_n(T_k) & A_n e^{i(\theta_l-\theta_0)} + \varepsilon_{MIA,l,T_k}(\omega_n) \\ \omega \neq \omega_n(T_k) & \varepsilon_{MIA,l,T_k}(\omega) \end{cases}$$

A target can now be estimated at $\omega(T_K)$. Due to the chirp parameterization, the position of the potential target is known at all previous measurement times, $\omega(T_{(K-1)})$, $\omega(T_{(K-2)})$, . . .

The complex-valued values $A(T_k)$ at the bin positions corresponding to the motion model are added and can thus raise $A_n$ above ε.

The second variant of the comparison is shown below as an example:

Instead of correcting the spectrum with the reference phase per bin from the reference antenna, as described above, it is also possible to only multiply with the conjugate complex value of the reference antenna. As a result, the amplitudes are indeed scaled to a kind of power, but this computational effort has advantages:

$$m_l * \exp(-j*phase(m_0)) = m_l * conj(m_0)/sqrt(Re(m_0)^2 + Im(m_0)^2)$$ is simplified to:

$$m_l * conj(m_0)$$

where "conj" is the complex conjugation, "exp" is the exponential function, and sqrt is the square root.

Between these two variants 1) and 2), there is another solution 1b), in which 1/sqrt is estimated.

A method of the invention can thereby provide the advantage that the measurement time or integration time for the respective capture can be effectively increased in the capture result. In other words, a signal-to-noise ratio can be improved. This can preferably be done while simultaneously maintaining the cycle duration and/or the measurement time (capture time period) per cycle. Because this improvement can affect not only one receive antenna but all receive antennas, a correct determination of the angle of arrival is also possible in addition to the pure detection.

Even if the S/N (signal-to-noise ratio) were sufficient to enable detection, the S/N on all receive antennas can advantageously be increased using a method of the invention, and thus the angle determination can be stabilized.

The capture result corresponds, for example, with regard to the information and/or the dimensions (for example, as a two-dimensional matrix) to the single sensor signal from which the capture result was formed by the combining. In contrast to this sensor signal, however, the capture result can have an improved signal-to-noise ratio. It is possible in this regard that a two-dimensional capture result (2D spectrum), which is specific for a velocity and/or for a spatial distance of the raw targets, can be determined by means of a two-dimensional Fourier transformation of the sensor signals.

It is also possible for the capture result to be calculated for motion models outside the unique spectral range.

Optionally, it can be provided that one of the receive antennas is defined as the reference antenna, and the comparison is carried out by processing, for each of the further receive antennas, the captured sensor signal of the respective further receive antenna with the captured sensor signal of the reference antenna in order to obtain the phase-adjusted sensor signal of the respective further receive antenna. In this way, for example, a phase-adjusted sensor signal of the second receive antenna, a phase-adjusted sensor signal of the third receive antenna, and a phase-adjusted sensor signal of the fourth receive antenna can be obtained, wherein a first receive antenna serves as the reference antenna. In particular, this comparison makes use of the fact that the phase relationship of the sensor signals of these receive antennas to one another is known due to equidistant and/or previously known spatial distances of the receive antennas. The phase of the sensor signals can therefore be harmonized and/or normalized in this way by the comparison. This can also enable the subsequent combining of the sensor signals, because the combining might otherwise not be possible due to the different phases of the sensor signals.

It can optionally be possible that each of the captured sensor signals is in the form of digital capture information with different values and in each case different (possibly at least partially spatial) positions, in particular a one- or two-dimensional coordinate, preferably for a capture field of the radar system, and preferably the phase-adjusted sensor signals are formed from these values and positions on the basis of the comparison, wherein the following steps are performed preferably for the combining: carrying out a shift of the values in the phase-adjusted sensor signals as a function of a detection parameter of the detection, in particular velocity and/or direction of movement and/or the like of the vehicle; and carrying out a linear combining of the phase-adjusted sensor signals of the same receive antennas, preferably by forming an arithmetic mean or a summation or the like.

Because the sensor signals of different repetitions are not captured immediately one after the other, but only after certain time intervals (for example, the cycle duration), a relative position between the vehicle and the raw target has already been changed in the meantime depending on the movement of the vehicle. Because the values and positions for the detection of this raw target can be specific, the movement of the vehicle must be taken into account accordingly in the combining. This can be done by adjusting the position information of the sensor signal based on the detection parameter.

For example, it can be provided that the captured sensor signal is specific for a distance and/or a relative velocity of at least one raw target detected by the detection. For example, a Fourier transformation of the sensor signal or the capture result can be carried out to determine this information.

A further advantage can be achieved within the scope of the invention if the combining is carried out for multiple and in particular each of the repetitions in order to provide the capture result in each case, wherein a spectrum for the detection is determined from the capture results in each case. For example, the spectrum can be made two-dimensional in order to easily determine a distance and/or a relative velocity for the raw targets.

A further advantage within the scope of the invention can be achieved if one of the receive antennas is defined as a reference antenna for further receive antennas, and each of the captured sensor signals is in the form of digital capture information with different values and in each case different positions, wherein, preferably in the comparison, the captured sensor signals of different receive antennas are processed by multiplying position by position the captured sensor signal of the respective further receive antenna by a complex conjugate of the captured sensor signal of the reference antenna in order to provide a phase-adjusted sensor signal for the respective further receive antenna. In other words, a projection can be carried out in which the phases are harmonized. This enables the reliable further processing of different sensor signals of different repetitions.

It is advantageous moreover if, within the scope of the invention, the combining is carried out with the phase-adjusted sensor signals from at least two or at least three or at least four of the repetitions. This has the advantage that noise in the sensor signal can be reduced thereby. In other words, the signal-to-noise ratio can be improved.

In addition, it is conceivable within the scope of the invention that the combining is carried out only with the phase-adjusted sensor signals of the same receive antennas. A capture result can also be determined for each of the receive antennas (possibly except for the reference antenna) per repetition.

It is advantageous additionally if the repeated captures of the sensor signal are each carried out during a capture time period, wherein the repetitions are carried out in particular at intervals of a cycle duration.

It is possible further that the capture time period is in the range from 2 ms to 40 ms, preferably 4 ms to 30 ms, preferably 8 ms to 20 ms, and/or the cycle duration is in the range from 20 ms to 100 ms, preferably 30 ms to 70 ms, and is preferably 50 ms. This enables reliable detection of objects, i.e., in particular of raw targets and/or of reflected signals from the vehicle's environment.

Furthermore, it can be provided that the combining is executed to obtain a numerically increased (effective) capture time period for the capture result by combining in-phase multiple sensor signals captured successively in time, in particular of the same receive antennas, each with a capture time period shorter than the increased capture time period. The in-phase combining can take place, for example, by aligning the phases by means of the comparison. The in-phase combining can also be regarded as a coherent addition and/or as an integration.

Likewise, the object of the invention is a radar system for a vehicle having at least one or at least two receive antennas and comprising a processing device which is adapted so that the processing device executes the following steps: carrying out a capture of a sensor signal in each of the receive antennas of the radar system, preferably by an analog-to-digital conversion, wherein the sensor signal captured as a result is specific for a detection of raw targets by the radar system; and carrying out a comparison of the captured sensor signal or the captured sensor signals of different receive antennas for the provision in each case of a phase-adjusted sensor signal, wherein, for example, the phase-adjusted sensor signals from different repetitions of the steps are combined to provide a capture result. Thus, the radar system of the invention provides the same advantages as have been described in detail with reference to a method of the invention. In addition, the radar system can be suitable for carrying out a method of the invention.

A further advantage can be provided that the receive antennas are provided as at least two or at least three or at least four or at least five receive antennas. This enables a reliable capture of the vehicle's environment.

The radar system is executed, for example, as a 24 GHz or a 77 GHz radar system. Alternatively or in addition, the radar system is designed as a continuous-wave radar, in particular as an FMCW (frequency-modulated continuous-wave radar), which can perform a distance and/or velocity measurement.

Furthermore, the vehicle can be a motor vehicle and/or passenger vehicle and/or autonomous vehicle and/or electric vehicle and/or the like. The (possibly processed) capture information is used, for example, by an assistance system and/or by a control unit of the vehicle, which provides at least partially autonomous driving and/or automatic parking of the vehicle.

For example, it can be provided within the scope of the invention that a processor such as a computer program, in particular a computer program product, is provided which, when executed by the processing device, causes it to carry out the steps of a method of the invention. Further, such a computer program is protected as an object of this invention. A computer-readable medium, in particular a data carrier, with the computer program of the invention is also protected.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
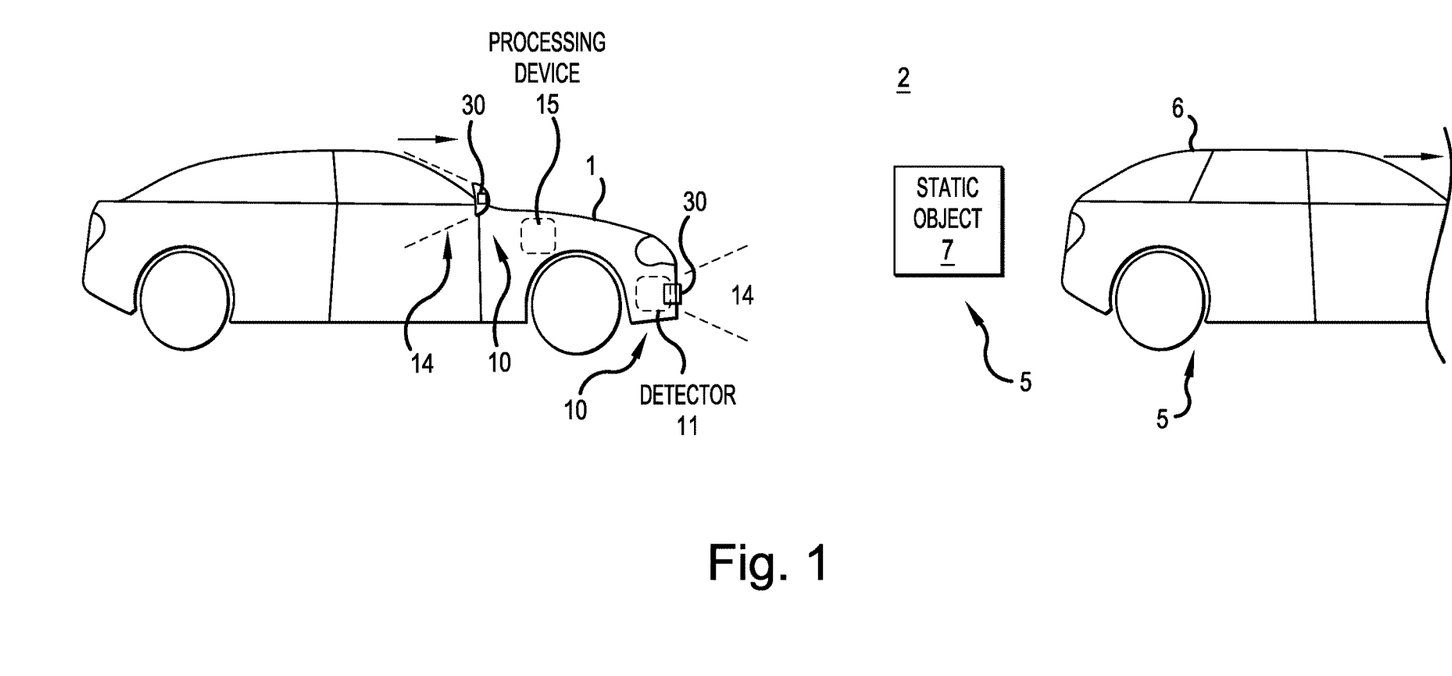
FIG. 1 is a schematic view of a vehicle with a radar system of the invention and a further vehicle traveling in front, each in a side view.

A vehicle 1 with a radar system 10 of the invention is shown schematically in FIG. 1. An arrow symbolizes the direction of movement of vehicle 1. In addition, a moving object 6 in the form of a further vehicle traveling in front and a static object 7 in an environment 2 of vehicle 1 are shown. The moving and static objects are each objects 5 which are located in at least one capture field 14 of radar system 10. By way of example, FIG. 1 shows different capture fields 14 for different positions of at least one receive antenna 30, which can be provided alternatively or in combination. The arrangement of radar system 10 is thus at least partially possible in the exterior mirror or in the bumper or the like. A radar sensor 11 as a detector 11 can receive reflections from these objects 5 over the at least one receive antenna 30, depending on the position of vehicle 1, and use these reflections to detect objects 5 as raw targets 5 and/or to reconstruct the environment 2. For this purpose, a capture signal 101 is captured and signal processing of capture signal 101 is carried out by a processing device 15, wherein capture signal 101 can be received by the at least one receive antenna 30.

Figure 2:
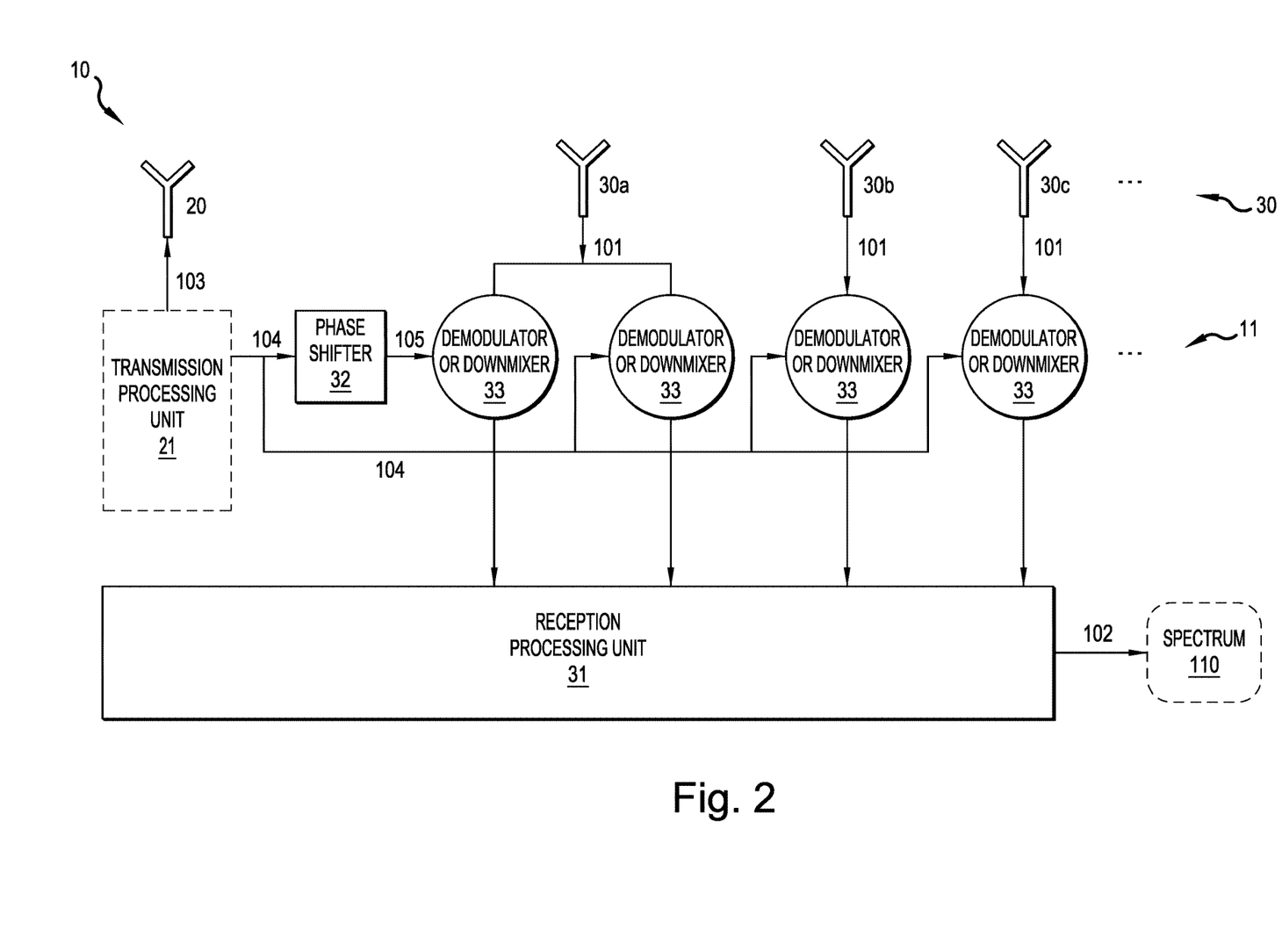
FIG. 2 is a schematic circuit diagram of components of a radar system of the invention.
Figure 3:
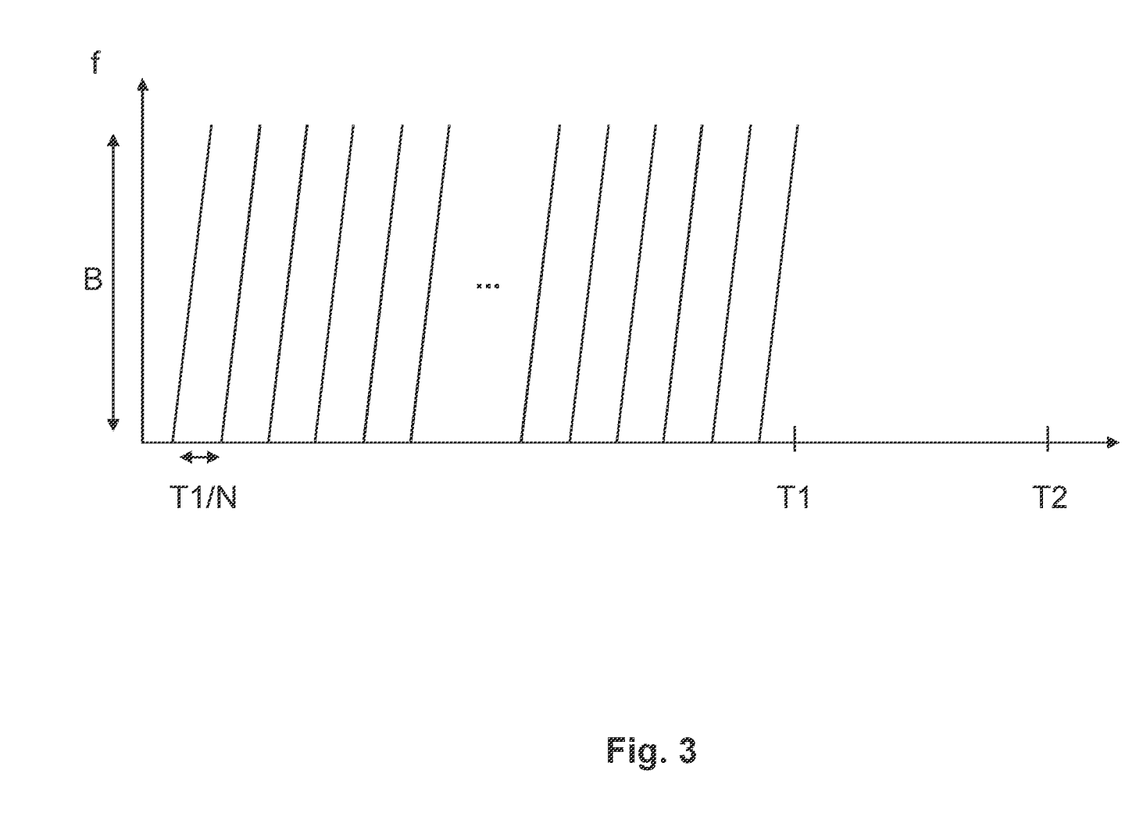
FIG. 3 is a schematic diagram of a detection of a radar system of the invention.

In FIG. 2, the described capture is shown in more detail with further details using a schematic circuit diagram of a radar system 10 of the invention. For example, at least one transmit antenna 20 and at least one first 30a, second 30b, and third 30c receive antenna are provided. First, a transmission signal 103 is generated via a transmission processing unit 21, which is emitted into environment 2 of vehicle 1 via the at least one transmit antenna 20. Such a transmission signal 103 is shown in more detail by way of example in FIG. 3. The radar system is, for example, a continuous-wave radar and/or an FMCW radar (frequency-modulated continuous-wave radar), which in particular provides a distance and/or velocity measurement, preferably by means of the Doppler effect. It can be, for example, a 24 GHz or 77 GHz radar system. In order to capture parameters of objects 5 in environment 2 of vehicle 1, such as, for example, the distance or velocity or the angle, transmission signal 103 can be modulated, for example, with regard to the frequency f. Advantageously, for the capture, N frequency chirps can be output sequentially within the time period T1 with a varying frequency f as a transmission signal 103 via the at least one transmit antenna 20. In the case of such a chirp, the frequency f can change over time in the range of the bandwidth B. The duration of a respective chirp is then T1/N, as is also shown schematically by a double arrow in FIG. 3. For example, a linear frequency modulation can be used in which the frequency f changes linearly within the bandwidth B in the case of a respective chirp. After the time period T1, an evaluation of a received signal 101 (or also capture signal 101) can take place within the period T2-T1. The entire measuring cycle thus has a duration T2, which thus corresponds to a cycle duration T2.

According to FIG. 2, for receiving at least one capture signal 101, receive antennas 30 can be arranged equidistantly at a predetermined distance. The transmitted transmission signal 103 can be reflected and/or backscattered by each object 5 in capture field 14, and thus can reach at least one of receive antennas 30. The capture signal 101 received thereby can then be demodulated and/or downmixed, in particular by the shown demodulator 33 or downmixer 33. Capture signal 101 (also referred to as sensor signal 101) can then be converted into digital capture information 102 (also referred to as a captured sensor signal 102) by an analog-to-digital converter of a reception processing unit 31. Up to the end of time period T1 as a capture time period T1, the data determined thereby can be stored in an M×N matrix with M samples per chirp and N chirps. Using this matrix, a spectrum 110, specific for a relative velocity and/or a distance of objects 5 in environment 2 in capture field 14, can then be determined by a Fourier transformation of the matrix (i.e., capture information 102). This is in particular a two-dimensional spectrum 110 (corresponding to the two-dimensional matrix according to capture information 102), so that the different coordinates represent the different parameters (such as the distance and the relative velocity).

In order to also be able to determine a phase of capture signal 101 during the capture, it may be possible for at least one of the downmixes to be executed twice by downmixer 33. In one of the downmixes, the reference frequency 104 used for this can then be phase-shifted by a phase shifter 32 and thus converted into a phase-shifted reference frequency 105. In this way, for example, an I & Q method (in-phase & quadrature method) can be provided.

In order to obtain improved capture information 102 (e.g., with regard to the signal-to-noise ratio), further processing of capture information 102 can take place according to the invention. Spectrum 110 can then be determined from this processed capture information 102. For this purpose, capture information 102 is, for example, first converted into a phase-adjusted sensor signal 120 and then, if necessary, transformed into a combined sensor signal 121 (as capture result 121), from which spectrum 110 can be determined.

Figure 4:
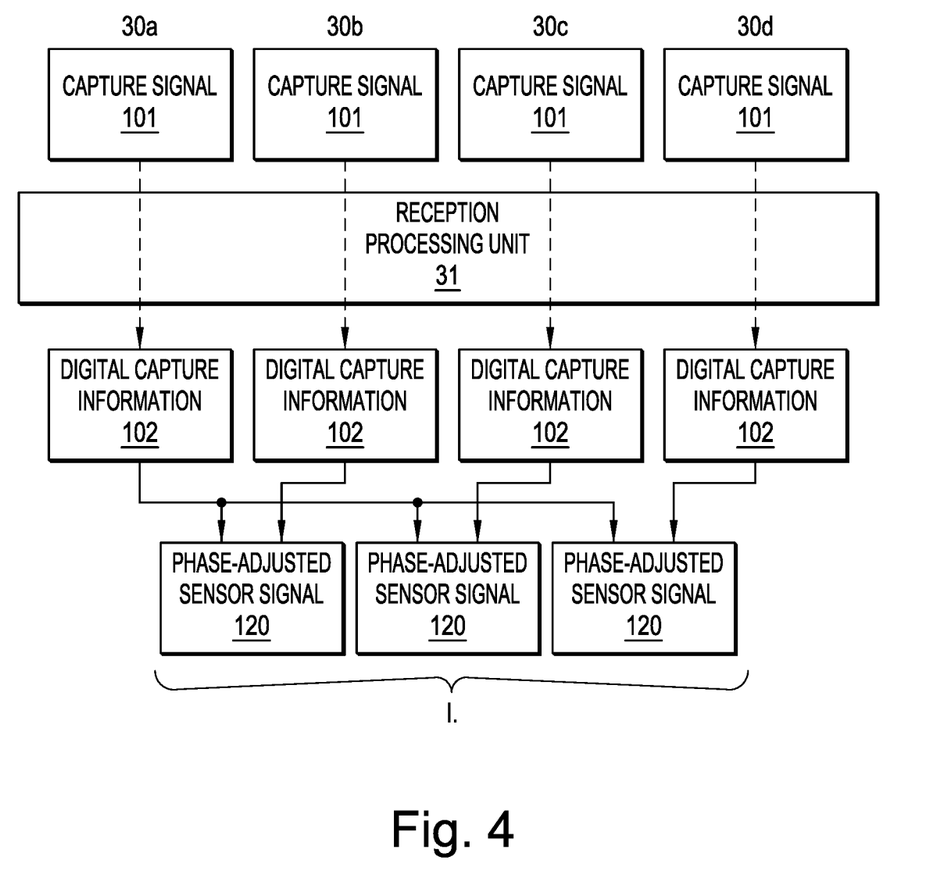
FIG. 4 is a schematic diagram of a comparison of a method of the invention.

In FIG. 4, the execution of a comparison in a method of the invention is shown schematically with further details. It can be seen here that a sensor signal 101 for a first receive antenna 30a, a sensor signal 101 for a second receive antenna 30b, a sensor signal 101 for a third receive antenna 30c, as well as a sensor signal 101 for a fourth receive antenna 30d are received and in each case converted by means of a reception processing unit 31 into a captured sensor signal 102 (capture information 102). The number of receive antennas here is exemplary, so that further receive antennas 30 and thus further sensor signals 101 can also be provided if necessary. In this case, the first receive antenna 30a can be defined as a reference antenna 30a. Captured sensor signal 102 of reference antenna 30a can be compared with the captured sensor signal 102 of second receive antenna 30b in order to obtain a phase-adjusted sensor signal 120 for the second receive antenna 30b. Correspondingly, a phase-adjusted sensor signal 120 for third receive antenna 30c and a phase-adjusted sensor signal 120 for fourth receive antenna 30d can also be determined. These determined phase-adjusted sensor signals 120 can then be associated with a specific cycle in which they were captured. This cycle is designated by I in FIG. 4 by way of example.

Figure 5:
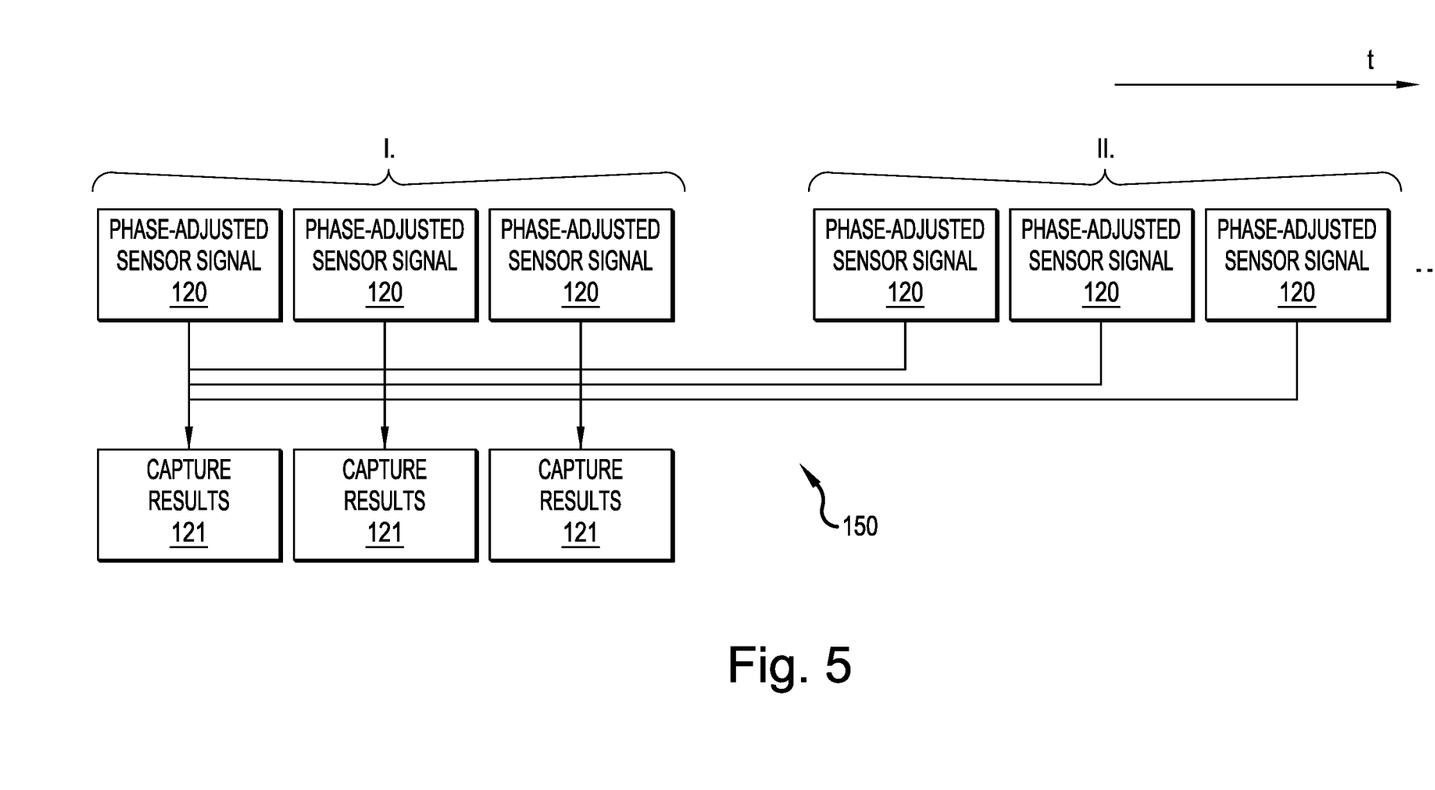
FIG. 5 is a schematic diagram of a combining in a method of the invention.

According to FIG. 5, the further processing is shown in which a combining 150 of the phase-adjusted sensor signals 120 of a first cycle I with the phase-adjusted sensor signals 120 of a second cycle II following in time is carried out. In this way, associated capture results 121 can be determined for each of the receive antennas 30 (possibly with the exception of reference antenna 30a).

Figure 6:
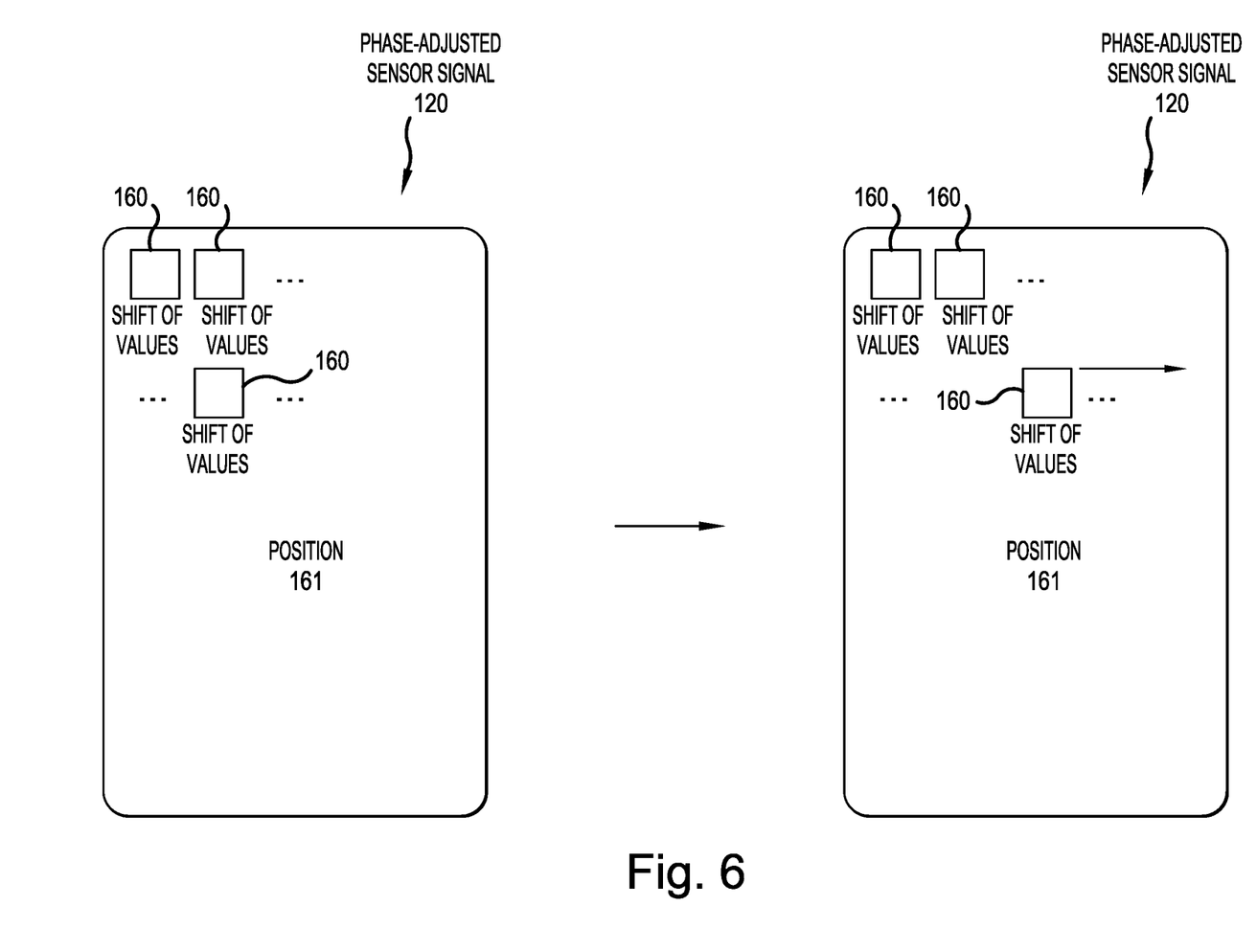
FIG. 6 is a schematic diagram of a combining in a method of the invention.

In FIG. 6 it is shown schematically that with this combining 150 a shift of values 160 with respect to position 161 must take place at least in the case of one of the phase-adjusted sensor signals 120 used for combining 150.

Figure 7:
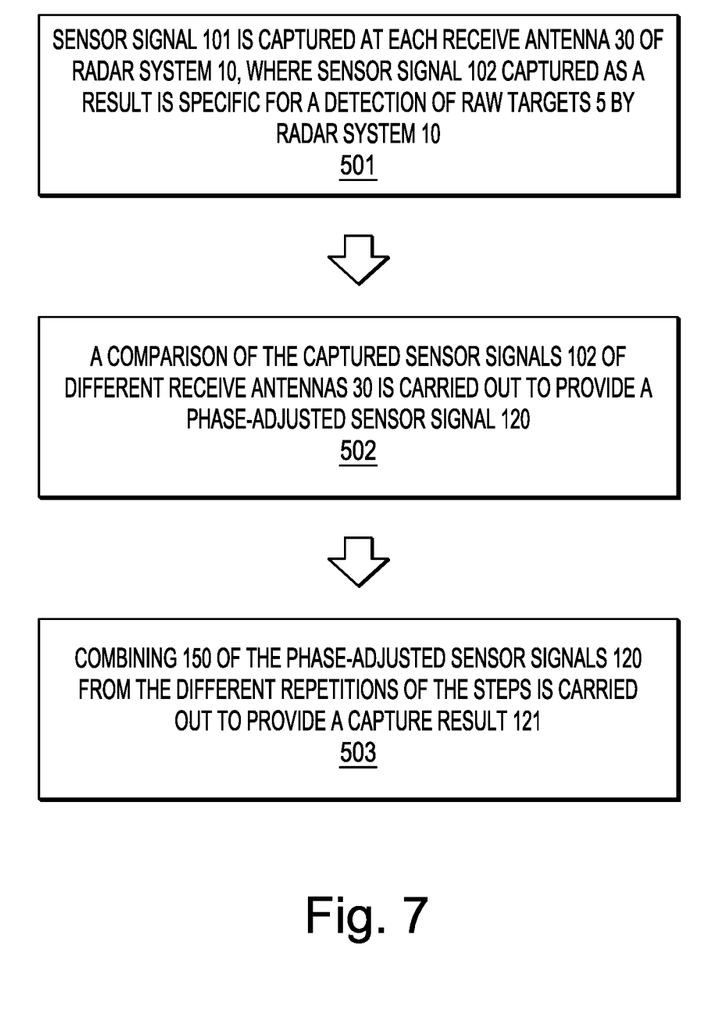
FIG. 7 is a schematic diagram for visualizing the steps of a method of the invention.

FIG. 7 schematically visualizes a method of the invention. According to a first method step 501, a sensor signal 101 is captured at each of the receive antennas 30 of radar system 10, wherein sensor signal 102 captured as a result is specific for a detection of raw targets 5 by radar system 10. Subsequently, according to a second method step 502, a comparison of the captured sensor signals 102 of different receive antennas 30 can be carried out in each case to provide a phase-adjusted sensor signal 120. According to a third method step 503, a combining 150 of the phase-adjusted sensor signals 120 from different repetitions of the steps is carried out to provide a capture result 121.

The above explanation of the embodiments describes the present invention solely in the context of examples. Of course, individual features of the embodiments can be freely combined with one another, if technically feasible, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for capture in a radar system of a vehicle, the radar system having receive antennas, the method comprising:
   carrying out a capture of a respective sensor signal in each of the receive antennas of the radar system to provide captured sensor signals, the captured sensor signals being specific for a detection of raw targets by the radar system;
   carrying out a comparison of the captured sensor signals of different receive antennas to provide, in each case, a phase-adjusted sensor signal,
   wherein a combining of the phase-adjusted sensor signals from different repetitions of the steps is carried out to provide a capture result.

2. The method according to claim 1, wherein one of the receive antennas is defined as a reference antenna, and the comparison is carried out by processing, for each remaining receive antenna of the receive antennas, the captured sensor signal of each respective remaining receive antenna with the captured sensor signal of the reference antenna in order to obtain the phase-adjusted sensor signal of each respective remaining receive antenna.

3. The method according to claim 1, wherein each of the captured sensor signals is in the form of digital capture information with different values and in each case different positions of a capture field of the radar system, and wherein the phase-adjusted sensor signals are formed from these values and positions on the basis of the comparison, wherein the following steps are performed for the combining:
   carrying out a shift of the values in the phase-adjusted sensor signals as a function of a detection parameter of the detection; and
   carrying out a linear combining of the phase-adjusted sensor signals of the same receive antennas.

4. The method according to claim 3, wherein the detection parameter of the detection is a velocity of the vehicle.

5. The method according to claim 1, wherein the captured sensor signal is specific for a distance and a relative velocity of at least one raw target detected by the detection.

6. The method according to claim 1, wherein the combining is carried out for multiple or for each of the repetitions in order to provide the capture result, wherein a spectrum for the detection is determined from the capture result in each case.

7. The method according to claim 1, wherein one of the receive antennas is defined as a reference antenna for remaining receive antennas of the receive antennas, and each of the captured sensor signals is in the form of digital capture information with different values and in each case different positions, wherein in the comparison, the captured sensor signals of different receive antennas are processed by multiplying position by position the captured sensor signal of each respective one of the remaining receive antennas by a complex conjugate of the captured sensor signal of the reference antenna in order to provide a phase adjusted sensor signal for each respective one of the remaining receive antennas.

8. The method according to claim 1, wherein the combining with the phase-adjusted sensor signals from at least two or at least three or at least four of the repetitions is carried out in order to reduce noise in the sensor signal.

9. The method according to claim 1, wherein the combining is carried out only with the phase-adjusted sensor signals of the same receive antennas.

10. The method according to claim 1, wherein the captures of the captured sensor signals are each carried out during a capture time period, wherein the repetitions are carried out at intervals of a cycle duration, wherein the capture time period is in the range from 2 ms to 40 ms, and the cycle duration is in the range from 20 ms to 100 ms.

11. The method according to claim 1, wherein the combining is executed to obtain a numerically increased capture time period for the capture result by combining in-phase multiple captured sensor signals that were captured successively in time from identical receive antennas, each with a capture time period shorter than the increased capture time period.

12. A radar system comprising:
receive antennas for a vehicle; and
a processing device that is adapted so that the processing device executes the following steps:
carrying out a capture of a respective sensor signal in each of the receive antennas of the radar system to provide captured sensor signals, wherein the captured sensor signals are specific for a detection of raw targets by the radar system; and
carrying out a comparison of the captured sensor signals of different receive antennas to provide, in each case, a phase-adjusted sensor signal,
wherein a combining of the phase-adjusted sensor signals from different repetitions of the steps is carried out to provide a capture result.

13. The radar system according to claim 12, wherein the receive antennas are provided as at least two or at least three or at least four or at least five receive antennas.

14. The radar system according to claim 12, further comprising a non-transitory computer-readable medium storing a computer program thereon which, when executed by the processing device, causes the processing device to carry out the steps of carrying out a capture and a comparison.

* * * * *